United States Patent
Goldman

(10) Patent No.: US 9,392,427 B2
(45) Date of Patent: Jul. 12, 2016

(54) PROVIDING PRESENCE INFORMATION IN A PERSONAL COMMUNICATIONS SYSTEM COMPRISING AN INTERFACE UNIT

(71) Applicant: Tomasz Jerzy Goldman, Hellerup (DK)

(72) Inventor: Tomasz Jerzy Goldman, Hellerup (DK)

(73) Assignee: GN Netcom A/S (DK)

( * ) Notice: Subject to any disclaimer, the term of this patent is extended or adjusted under 35 U.S.C. 154(b) by 0 days.

(21) Appl. No.: 13/926,593

(22) Filed: Jun. 25, 2013

(65) Prior Publication Data
US 2014/0004835 A1    Jan. 2, 2014

(30) Foreign Application Priority Data

Jun. 27, 2012 (EP) ..................... 12173832

(51) Int. Cl.
- H04M 3/42 (2006.01)
- H04W 4/16 (2009.01)
- H04M 1/725 (2006.01)
- H04L 29/08 (2006.01)
- H04M 1/60 (2006.01)

(52) U.S. Cl.
CPC ............ *H04W 4/16* (2013.01); *H04M 1/72502* (2013.01); *H04L 67/24* (2013.01); *H04M 1/6066* (2013.01); *H04M 2250/02* (2013.01); *H04M 2250/08* (2013.01)

(58) Field of Classification Search
CPC ...... H04W 8/18; H04W 4/02; H04M 2207/18
USPC .................................................. 455/414.1
See application file for complete search history.

(56) References Cited

U.S. PATENT DOCUMENTS

| | | | |
|---|---|---|---|
| 2007/0178900 A1* | 8/2007 | Frank et al. | 455/435.1 |
| 2007/0268130 A1 | 11/2007 | Yee et al. | |
| 2008/0299948 A1* | 12/2008 | Rosener | 455/412.2 |
| 2009/0305632 A1 | 12/2009 | Sarkissian et al. | |

FOREIGN PATENT DOCUMENTS

| WO | WO2008/058151 | 5/2008 |
| WO | WO2009/026575 | 2/2009 |

OTHER PUBLICATIONS

European Extended Search Report for European application No. 12173832.2 dated Dec. 3, 2012.

* cited by examiner

*Primary Examiner* — Vladimir Magloire
*Assistant Examiner* — Juan C Perez Tolentino
(74) *Attorney, Agent, or Firm* — Altera Law Group, LLC

(57) ABSTRACT

Presence information is provided in a personal communications system comprising an interface unit (21), the interface unit comprising a computer interface connecting the interface unit (21) to a client computer (1); and a first transceiver exchanging radio signals between interface unit (21) and a mobile telephone (22) according to a first wireless communication protocol; and/or a telephone interface connecting interface unit (21) to a desktop telephone (23). The method comprises the steps of providing a presence message indicating whether the mobile telephone (22) or the desktop telephone (23) is involved in a phone call; and transmitting the presence message to the client computer (1) via the computer interface. Thus better and more reliable presence information taking use of mobile or desktop telephones into account can easily be provided.

12 Claims, 3 Drawing Sheets

PROVIDING PRESENCE INFORMATION IN A PERSONAL COMMUNICATIONS SYSTEM COMPRISING AN INTERFACE UNIT

TECHNICAL FIELD

The invention relates to providing presence information in a personal communications system comprising an interface unit.

BACKGROUND

In computer and telecommunications networks, presence information is often used as a status indicator that shows whether a user of a device in the network is available for communication. The presence information is normally provided by a presence application in the device, e.g. a client computer, and transmitted to a presence server connected to the network, e.g. the Internet or a local area network, from which it is made available for other devices or computers connected to the network. The presence information may be based on the activity performed in or by the computer of the user. As an example, the presence information may show that the user is available when a keyboard or a mouse is in use. When the keyboard or the mouse has not been used for some time, the presence information may indicate that the user is away.

Often a computer also comprises a soft phone application, which uses a headset system comprising a headset and a base station to perform telephone communications via the network. When a telephone conversation is performed by the soft phone application the presence information could indicate that the user is involved in a conversation.

As examples of commercially available presence systems, or systems using presence information, Microsoft Office Communicator and Cisco Unified Communicator can be mentioned.

In such presence systems the user presence status is thus derived solely from computer and/or soft phone activity. This, means that if the user is busy with other activities, such as speaking on a mobile telephone or a desktop telephone, and thus unavailable for a new communication, the presence information obtained from the presence server regarding this user falsely indicates that the user is available.

It could be possible to install a special presence application on mobile telephones and have this application send information about call activity to the presence server, either via the mobile network or via e.g. a Bluetooth link. However, as mentioned, this solution requires that a special application is installed on mobile telephones, which is not practical, and further, it does not solve the problem for e.g. desktop telephones.

US 2009/305632 shows a system in which a Bluetooth headset connected by a Bluetooth link to a mobile telephone can communicate presence information via a second Bluetooth link to a computer on which a presence application is running. However, this solution requires that the headset is capable of communicating via two Bluetooth links simultaneously and also that the headset comprises circuitry for providing the presence information. Further, like the solution mentioned above, this solution does not solve the problem for e.g. desktop telephones.

SUMMARY

Therefore, it is an object of embodiments of the invention to provide a solution in which presence information does not falsely indicate that a user is available for a new communication when he is actually busy with other activities, such as speaking on a mobile telephone or a desktop telephone.

According to embodiments of the invention the object is achieved by a method of providing presence information in a personal communications system comprising an interface unit, the interface unit comprising a computer interface for connecting the interface unit to a client computer; and at least one of a first transceiver configured to exchange radio signals between the interface unit and a mobile telephone according to a first wireless communication protocol; and a telephone interface for connecting the interface unit to a desktop telephone; wherein the method comprises the steps of: providing, based on signals from said first transceiver or said telephone interface, a presence message indicating whether said mobile telephone or said desktop telephone is involved in a phone call; and transmitting said presence message to said client computer via said computer interface.

When a presence message that indicates whether the mobile telephone or the desktop telephone is involved in a phone call is provided in the interface unit based on signals from the corresponding transceiver or interface, and transmitted to the client computer, a better and more reliable presence information that takes use of a mobile or desktop telephone into account can easily be provided in the client computer. Thus false availability indications in situations where the user is busy speaking on e.g. the mobile telephone are avoided.

The method may further comprise the steps of receiving said presence message in a presence application running on said client computer; combining in said presence application running on said client computer the received presence message with presence messages received from other sources related to said client computer to achieve aggregated presence information; and transmitting said aggregated presence information from said presence application running on said client computer to a presence server. This ensures that the improved presence information can be made available by the presence server.

In one embodiment the interface unit is a base station for a headset, where the base station comprises a second transceiver configured to exchange radio signals between the base station and a headset according to a second wireless communication protocol.

In one embodiment, the first wireless communication protocol is Bluetooth. Similarly, in one embodiment, the second wireless communication protocol is DECT.

In one embodiment, the computer interface is a USB port.

Some embodiments of the invention also relates to an interface unit, the interface unit comprising a computer interface for connecting the interface unit to a client computer; and at least one of a first transceiver configured to exchange radio signals between the interface unit and a mobile telephone according to a first wireless communication protocol; and a telephone interface for connecting the interface unit to a desktop telephone. The interface unit is further configured to provide, based on signals from said first transceiver or said telephone interface, a presence message indicating whether said mobile telephone or said desktop telephone is involved in a phone call; and transmit said presence message to said client computer via said computer interface.

Embodiments corresponding to those mentioned above for the method also apply for the interface unit.

Some embodiments of the invention also relate to a personal communications system for providing presence information, the system comprising a client computer connected to a presence server; an interface unit as described above connected to the client computer via said computer interface; and at least one of a mobile telephone and a desktop telephone connected to the interface unit via said first transceiver and said telephone interface, respectively.

Some embodiments of the invention relate to a computer program and a computer readable medium with program code means for performing the method described above.

BRIEF DESCRIPTION OF THE DRAWINGS

Embodiments of the invention will now be described more fully below with reference to the drawings, in which.

DETAILED DESCRIPTION

Figure 1:
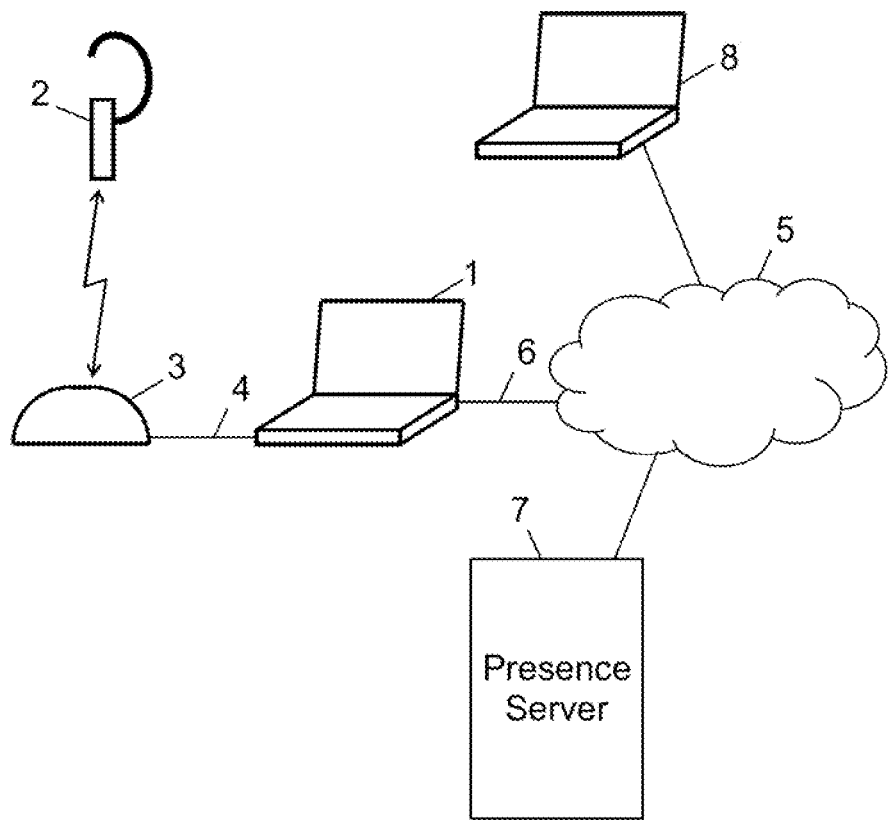
FIG. 1 shows a system in which presence information regarding a user of a client computer and a headset can be provided.

FIG. 1 illustrates an example of a personal communications system in which presence information regarding a user of a client computer and a headset can be provided. A client computer 1 is connected to a headset system 2, 3 via a connection 4, which may be connected to the client computer 1 by means of e.g. a USE interface. The headset system 2, 3 comprises a headset 2 and a base station or base unit 3. In the figure, the headset system is shown in an active state in which the headset 2 has been moved away from the base station 3, and a wireless connection has been established between the headset 2 and the base station 3 by transmitting radio signals between them. In a passive state, the headset 2 may be placed in the base station 3. The transmitted radio signals may represent sound (speech), data or control signals. The wireless communication between the headset 2 and the base station 3 may use any of a number of different wireless communication protocols, such as Digital Enhanced Cordless Telecommunications (DECT), Bluetooth, Wireless Fidelity (WiFi), or Ultra Wideband (UWB). At present DECT seems to be the most widely used wireless communication protocol for this application, and thus in the following a DECT headset system will be used as an example.

The client computer 1 may be a notebook computer, a desktop computer, a personal digital assistant (PDA) device, a smartphone or other computer types.

The client computer 1 is also connected to a network 5 via the connection 6. The network 5 may e.g. be the Internet or a local area network (LAN) connecting a number of computers and servers, illustrated by the further computer 8. Connected to the network 5 is also a presence server 7.

Figure 2:
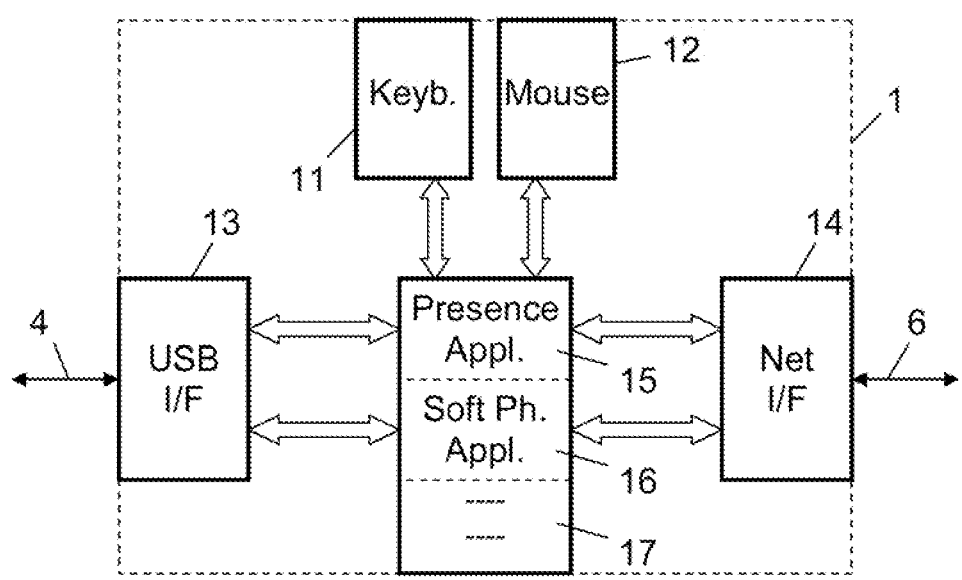
FIG. 2 shows a block diagram of the parts of a client computer in the system of FIG. 1.

Presence information is an indicator that shows a user's availability and/or willingness for communication in computer and telecommunications networks to other people, who may want to contact the user. The presence information is provided by a presence application running on the client computer of the user. This is illustrated in FIG. 2, which shows a block diagram of the parts of the client computer 1 that are relevant for this application.

The presence application 15 running on the client computer 1 provides the presence information indicating the availability of the user in dependence of the use of the client computer 1. For example, when the keyboard 11 and/or the mouse 12 is in use, the presence information could indicate that the user is available, i.e. present at his computer and not involved in other communication sessions. When the keyboard 11 and/or the mouse 12 has not been used for some time, the presence information could indicate that the user is away.

Also a soft phone application 16 is running on the client computer 1. This application uses the headset system 2, 3 to perform telephone communications via the network 5. The client computer 1, and thus the soft phone application 16, communicates with the headset system 2, 3 via a USS interface 13 and the connection 4 to the base station 3 and with the network 5 via a network interface 14 and the connection 6. However, other types of interfaces may be used as well. As an example, wireless interfaces could be used for communication with the headset system 2, 3 and/or the network 5. When a telephone conversation is performed by the soft phone application 16 the presence information could indicate that the user is involved in a conversation. The presence application 15 may obtain the information about the call either from the headset system 2, 3 or directly from the soft phone application 16.

The presence application 15 and the soft phone application 16 are only two among several other applications 17 running on the client computer 1. The presence application 15 may also use information from these other applications in providing the presence information.

The presence information provided by the presence application 15 is then transmitted through the network 5 to the presence server 7, in which it is stored and made available for other computers or devices connected to the network 5, such as the computer 8. Thus if e.g. the user of the computer 8 wants to communicate with the user of the client computer 1, he can obtain the presence information regarding this user from the presence server 7.

The type of presence information described above is often used in relation to Unified communications (UC), which is an integration of real time communication services such as instant messaging, presence information, telephony, video, data sharing, etc. Therefore, the service is often referred to as UC presence service.

Figure 3:
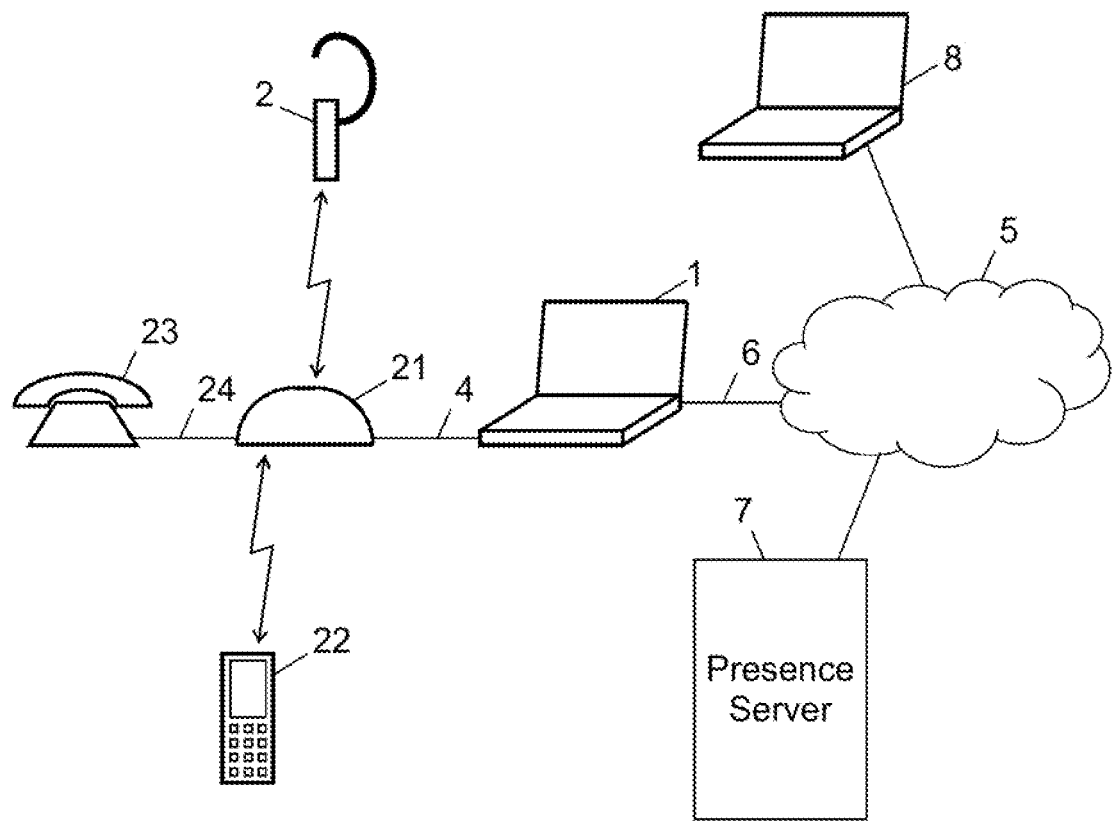
FIG. 3 shows a presence information system in which a base station for a headset is connected to a mobile telephone and to a desktop telephone.

Headset base stations are now available, which in addition to the headset and the client computer may also be connected to other telephones, such as a desktop telephone and/or a mobile telephone. This is illustrated in FIG. 3, in which the base station 21 like the base station 3 in FIG. 1 is connected to the headset 2 via a SECT radio link and to the client computer 1 via a USB connection. Further, the base station 21 is connected to a mobile telephone 22 via a wireless link, which in this example is a Bluetooth link, and to a desktop telephone 23 via a connection 24.

Figure 4:
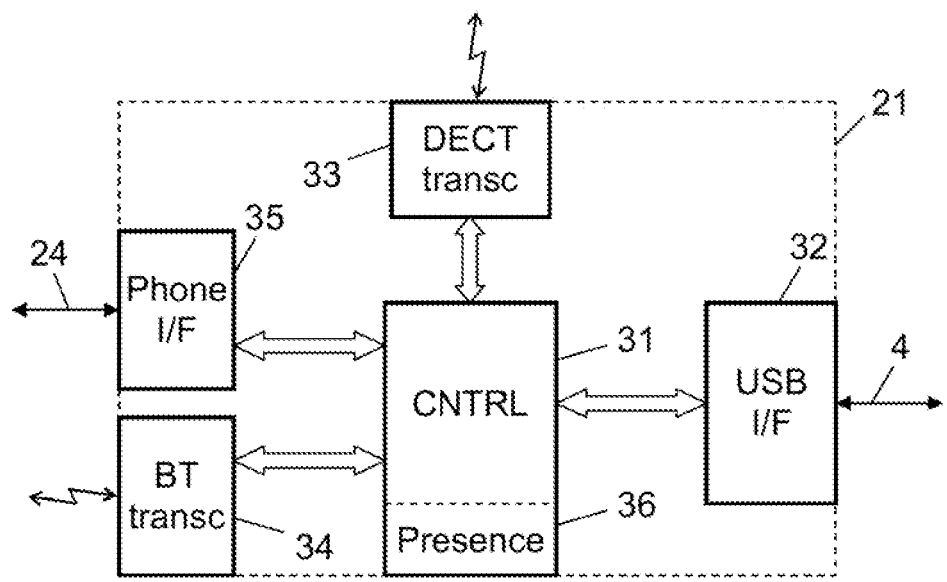
FIG. 4 shows a block diagram of the headset base station of Figure.

FIG. 4 shows a block diagram of the base station 21, which comprises a control unit 31 controlling the functions of the base station. The communications in and out of the base station 21 is performed through a USB interface 32 for communications with the client computer 1, a DET transceiver 33 for communications with the headset 2, a Bluetooth transceiver 34 for communications with the mobile telephone 22 and a telephone interface 35 for communications with the desktop telephone 23. This allows the headset 2 to be used for telephone conversations not only through the soft phone application 16 in the client computer 1, but also for calls via the mobile telephone 22 and the desktop telephone 23.

The control unit 31 also comprises a presence message determining device or presence application 36, which based on signals from the Bluetooth transceiver 34 and/or the telephone interface 35 can determine whether the user is involved in a telephone conversation using either the mobile telephone 22 or the desktop telephone 23. The presence message determined by the presence application 36 may also indicate use of the headset 2 with the soft phone application 16.

The presence message determined by the presence application 36 in the control unit 31 is then transmitted via the USB interface 32 and the connection 4 to the client computer 1, in which it is combined in the presence application 15 with the information from other devices, such as the keyboard 11 or the mouse 12 to provide the presence information that is subsequently transmitted to the presence server 7.

Thus it is now possible to get a "busy" or "in a call" indication for the user independently of whether the user is using the soft phone application 16, the mobile telephone 22 or the desktop telephone 23 for a telephone conversation.

In the above text it is assumed that the user uses the headset 2 for calls made with the mobile phone 22 or the desktop telephone 23. However, it is noted that the determined presence message may also be able to indicate that the user is busy in a telephone call if e.g. the mobile phone 22 is used directly, i.e. without using the headset 2 for the call. In this case the mobile telephone 22 can inform the base station 21 about the call through the Bluetooth link. This can e.g. be done by installing an application (e.g. a so-called App) in the mobile telephone that can transmit a message to the base station indicating that the mobile telephone is busy in a call. Similarly, the base station 21 can automatically get a message from the desktop telephone 23 when this telephone is active in a call, independently of whether the headset 2 is used for the call or not.

Further, the headset 2 may be omitted, and in that case the base station 21 may instead be considered as an interface unit connected to the mobile telephone 22 and/or the desktop telephone 23 and configured to provide presence information regarding these telephones to the presence application 15 running on the client computer 1.

The base station or interface unit 21 could also be a so-called speaker phone, i.e. a unit provided with a loudspeaker and a microphone so that it can be used for telephone conversations instead of a headset, with or without the possibility of connecting to a headset, or the base station or interface unit 21 could be embodied as a "dangle" attached to a USB port on the client computer 1.

If a headset is used, it need not be a wireless headset; it could just as well be a wired (corded) headset connected to the base station 21. In this case, as well as in the wireless embodiment, a handset could also be used instead of the headset.

Figure 5:
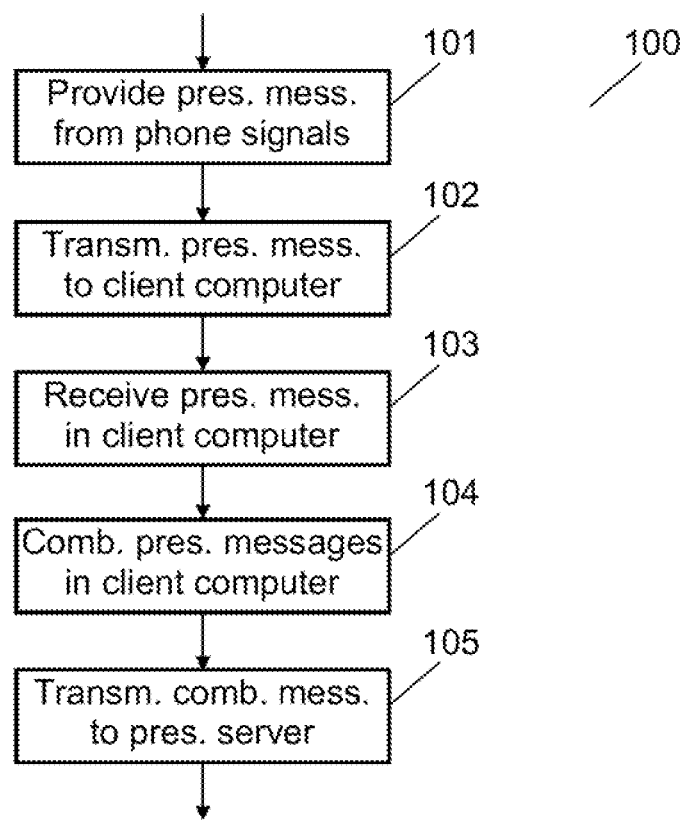
FIG. 5 shows a flow chart of a method of providing presence information ire a system comprising a base station for a headset.

FIG. 5 shows a flow chart 100 illustrating the method of providing the presence information described above. In step 101 the presence application 36 in the control unit 31 of the base station or interface unit 21 provides a presence message in dependence of signals from the Bluetooth transceiver 34 and/or the telephone interface 35 indicating whether the mobile telephone 22 or the desktop telephone 23 is involved in a telephone conversation. This presence message is transmitted to the client computer 1 via the USB interface 32 and the connection 4 in step 102. In step 103 the message is received in the presence application 15 running on the client computer 1, and then in step 104 the presence application 15 combines this message with other messages received from other sources, such as the keyboard 11 and the mouse 12 to obtain aggregated presence information. Finally, in step 105 this aggregated presence information is transmitted from the presence application 15 to the presence server 7 via the network interface 14, the connection 6 and the network 5, where it is stored and made available to other users.

Although various embodiments of the present invention have been described and shown, the invention is not restricted thereto, but may also be embodied in other ways within the scope of the subject-matter defined in the following claims.

The invention claimed is:

1. A method of providing user presence information in a personal communications system comprising a base station interface unit connectable to a wireless headset and a mobile phone and a computer, the interface unit comprising:
    a computer interface for connecting the interface unit to a client computer; and
    at least one of
        a first transceiver configured to exchange wireless audio and data signals between the interface unit and a mobile telephone according via first wireless communication protocol; and
        a telephone interface for connecting the interface unit to a desktop telephone;
    wherein the method comprises the steps of:
    establishing a first direct wireless audio and data communication link between the interface unit and the mobile phone;
    establishing a second direct wireless audio and data communication link between the interface unit and the headset, separate from said first link;
    establishing a third direct communications link between the interface unit and the desktop telephone;
    simultaneously monitoring, at the interface unit, the in-use status of the mobile phone, headset and desktop telephone
    generating, based on signals in-use status information from said interface unit, a presence message indicating whether said mobile telephone or said desktop telephone or headset is currently involved in a phone call; and
    transmitting said presence message to said client computer via said computer interface;
    receiving said presence message in a presence application running on said client computer;
    combining in said presence application running on said client computer the received presence message with presence messages received from other sources related to said client computer to achieve aggregated presence information; and
    transmitting said aggregated presence information from said presence application running on said client computer to a presence server;
    wherein said presence indicator is determined by monitoring the activity of the computer associated with said interface unit and if activity has occurred within a predetermined period of time, sending a signal to the presence indicator.

2. A method according to claim 1,
    wherein said interface unit is a base station for a headset, the base station comprising a second transceiver configured to exchange radio signals between the base station and a headset according to a second wireless communication protocol.

3. A method according to claim 1,
    wherein said first wireless communication protocol is Bluetooth.

4. A method according to claim 1,
    wherein said presence indicator is determined by monitoring the activation of a computer mouse associated with said interface unit and if the mouse has not been moved for a predetermined period of time, sending a signal to the presence indicator.

5. A method according to claim 1,
wherein said presence indicator is determined by monitoring the activation of a computer keyboard associated with said interface unit and if the keyboard has not been used for a predetermined period of time, sending a signal to the presence indicator.

6. An interface unit, the interface unit comprising:
a computer interface for connecting the interface unit to a client computer; and
a plurality of communication device including:
   a first wireless audio and data transceiver configured to directly exchange wireless signals between the interface unit and a mobile telephone according to a first wireless communication protocol;
   a second wireless audio and data transceiver configured to directly exchange wireless signals between the interface unit and a wireless headset according to a second wireless communication protocol and
   a telephone interface for connecting the interface unit to a desktop telephone;
wherein the interface unit is further configured to:
   monitor in-use status of said wireless transceivers and said telephone interface, at said interface unit to generate, based on signals from said first or second transceiver or said telephone interface, a presence message indicating whether said mobile telephone, headset or said desktop telephone is involved in-use in a phone call; and
   transmit said presence message to said client computer via said computer interface;
   receive said presence message in a presence application running on said client computer;
   combine, in said presence application running on said client computer, the received presence message with presence messages received from other sources related to said client computer to achieve aggregated presence information; and
   transmitting said aggregated presence information from said presence application running on said client computer to a presence server;
wherein said presence indicator is determined by monitoring the activity of the computer associated with said interface unit and if activity has occurred within a predetermined period of time, sending a signal to the presence indicator; whereby in-use presence can be determined with only single link from each of said communication devices.

7. An interface unit according to claim 6,
wherein said transceivers directly communicate with the interface unit and not directly with each other, except via said interface unit.

8. An interface unit according to claim 6,
wherein said first wireless communication protocol is Bluetooth.

9. An interface unit according to claim 6,
wherein said second wireless communication protocol is DECT.

10. An interface unit according to claim 6,
wherein said computer interface is a USB port.

11. A personal communications system for providing presence information, the system comprising:
a client computer connected to a presence server;
an interface unit connected to the client server;
a plurality of communication device including:
   a first wireless audio and data transceiver configured to directly exchange wireless signals between the interface unit and a mobile telephone according to a first wireless communication protocol;
   a second wireless audio and data transceiver configured to directly exchange wireless signals between the interface unit and a wireless headset according to a second wireless communication protocol and
   a telephone interface for connecting the interface unit to a desktop telephone;
wherein the interface unit is further configured to:
   monitor in-use status of said wireless transceivers and said telephone interface, at said interface unit to generate, based on signals from said first or second transceiver or said telephone interface, a presence message indicating whether said mobile telephone, headset or said desktop telephone is involved in-use in a phone call; and
   transmit said presence message to said client computer via said computer interface;
   receive said presence message in a presence application running on said client computer;
   combine, in said presence application running on said client computer, the received presence message with presence messages received from other sources related to said client computer to achieve aggregated presence information; and
   transmitting said aggregated presence information from said presence application running on said client computer to a presence server;
wherein said presence indicator is determined by monitoring the activity of the computer associated with said interface unit and if activity has occurred within a predetermined period of time, sending a signal to the presence indicator; whereby in-use presence can be determined with only single link from each of said communication devices.

12. A personal communications system according to claim 11, wherein said transceivers directly communicate with the interface unit and not directly with each other, except via said interface unit.

* * * * *